(12) United States Patent
McMahan et al.

(10) Patent No.: US 10,849,450 B1
(45) Date of Patent: *Dec. 1, 2020

(54) ANTI-FATIGUE MAT WITH AN ENCAPSULATIVELY SEALED GEL MEMBER

(71) Applicant: LET'S GEL INCORPORATED, Austin, TX (US)

(72) Inventors: Robert L McMahan, Cedar Park, TX (US); John P Busch, Austin, TX (US); Ira L Rush, Austin, TX (US); Derric C Hobbs, Austin, TX (US)

(73) Assignee: Let's Gel Incorporated, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,698

(22) Filed: Mar. 9, 2020

Related U.S. Application Data

(62) Division of application No. 14/705,957, filed on May 6, 2015, now Pat. No. 10,582,793.

(60) Provisional application No. 61/989,514, filed on May 6, 2014.

(51) Int. Cl.
| | | |
|---|---|---|
| *A47G 27/02* | (2006.01) |
| *B29C 45/14* | (2006.01) |
| *B29L 31/00* | (2006.01) |
| *B29K 105/04* | (2006.01) |
| *B29K 609/06* | (2006.01) |
| *B29K 75/00* | (2006.01) |

(52) U.S. Cl.
CPC .... *A47G 27/0231* (2013.01); *B29C 45/14065* (2013.01); *B29K 2075/00* (2013.01); *B29K 2105/04* (2013.01); *B29K 2609/06* (2013.01); *B29L 2031/7324* (2013.01)

(58) Field of Classification Search
CPC ...................... A47G 27/0231; B29C 45/14065
See application file for complete search history.

(56) References Cited

U.S. PATENT DOCUMENTS

| | | |
|---|---|---|
| 3,259,925 A | 7/1966 | Tilles |
| 3,634,895 A | 1/1972 | Childers |
| (Continued) | | |

FOREIGN PATENT DOCUMENTS

JP  6286245 B  2/2018

*Primary Examiner* — Victor S Chang
(74) *Attorney, Agent, or Firm* — Mark P Kahler

(57) ABSTRACT

An anti-fatigue mat is disclosed including a foam member and a gel member that each exhibit a different durometer. The foam member includes a support surface that supports the gel member atop the foam member. The foam member includes a foam ramp that extends outwardly downward from the gel member to a bottom surface of the foam member. A flexible cover layer is situated above the gel member and extends over the foam ramp so that the foam member and the flexible cover layer together encapsulatively seal the gel member therein. The flexible cover layer includes an indentation region situated substantially adjacent a gel/foam interface between the gel member and the foam member and further situated a predetermined distance from the peripheral edge of the mat in one embodiment. The bottom surface of the mat may include a non-slip surface to stabilize the mat on the particular surface that the mat covers.

18 Claims, 8 Drawing Sheets

(56) References Cited

U.S. PATENT DOCUMENTS

| | | | |
|---|---|---|---|
| 3,930,084 A * | 12/1975 | Shields | B29D 99/0057 |
| | | | 428/67 |
| 4,450,193 A | 5/1984 | Staebler | |
| 4,574,101 A | 3/1986 | Tricca | |
| 5,645,914 A | 7/1997 | Horowitz | |
| 6,324,710 B1 | 12/2001 | Hernandez | |
| 6,568,005 B2 | 5/2003 | Fleming | |
| 6,651,277 B1 | 11/2003 | Marson | |
| 6,851,141 B2 | 2/2005 | McMahan | |
| 7,682,680 B2 | 3/2010 | McMahan | |
| 7,754,127 B2 | 7/2010 | McMahan | |
| 8,034,274 B1 | 11/2011 | McMahan | |
| 9,452,597 B2 | 9/2016 | McMahan | |

\* cited by examiner

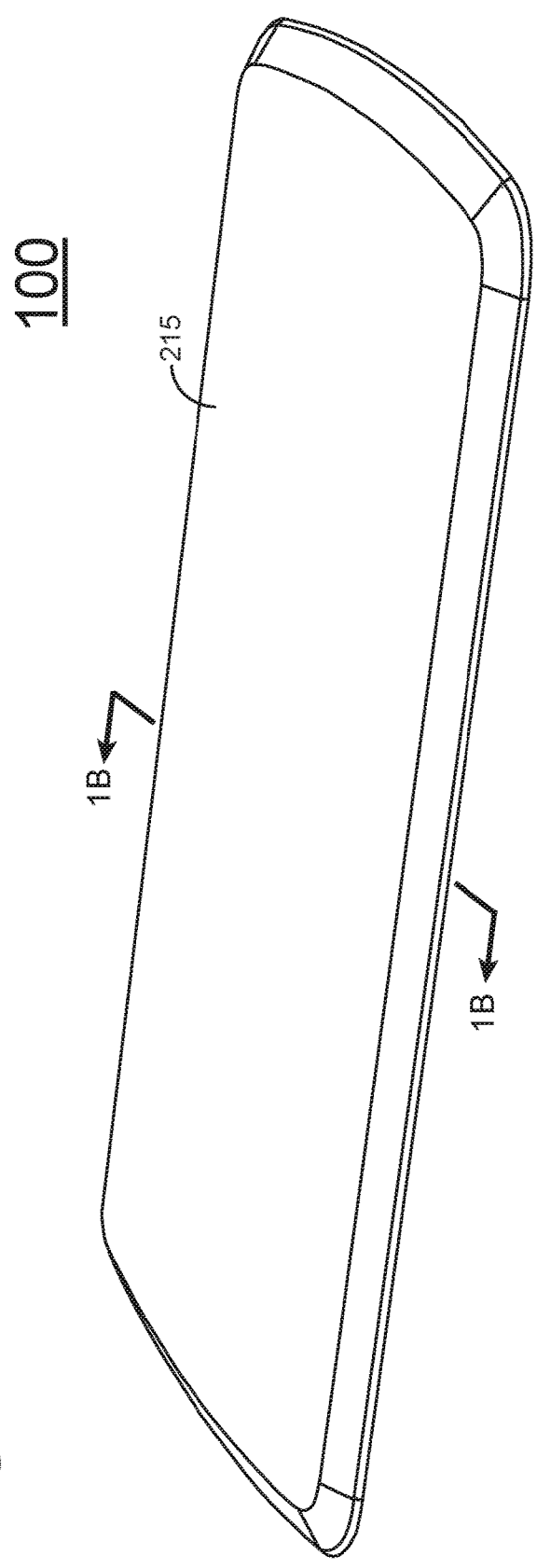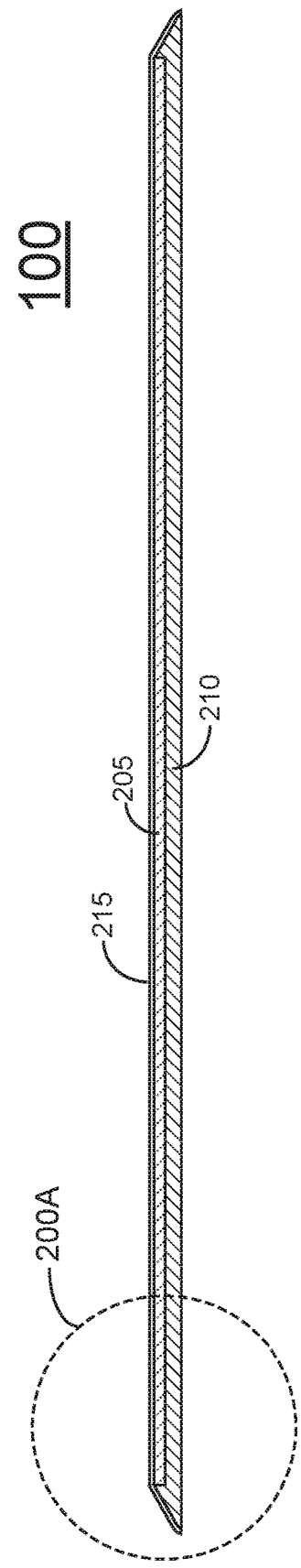

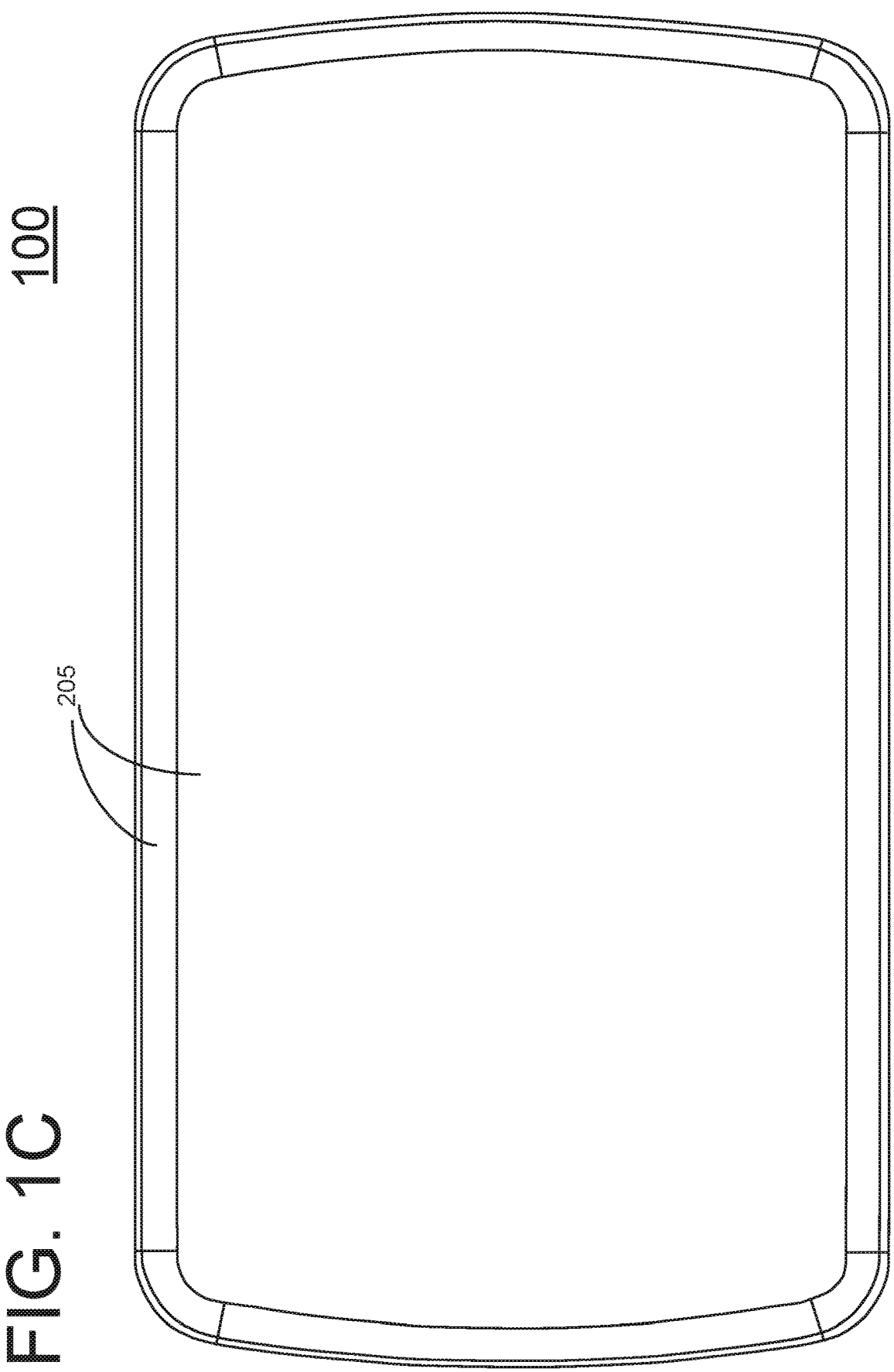

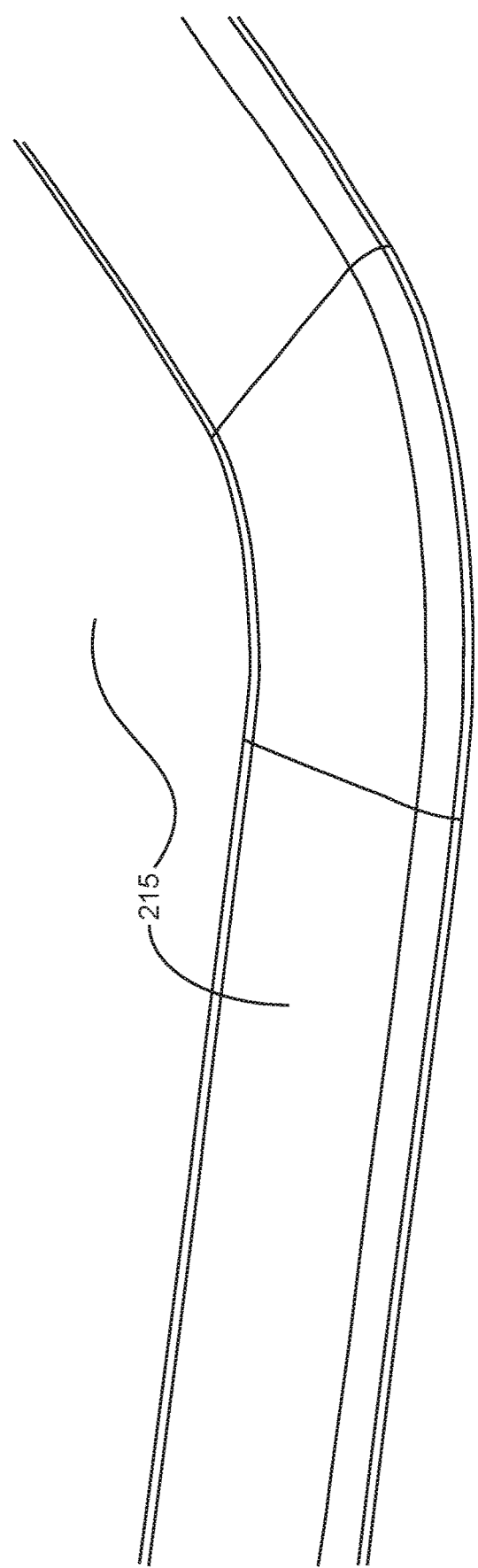

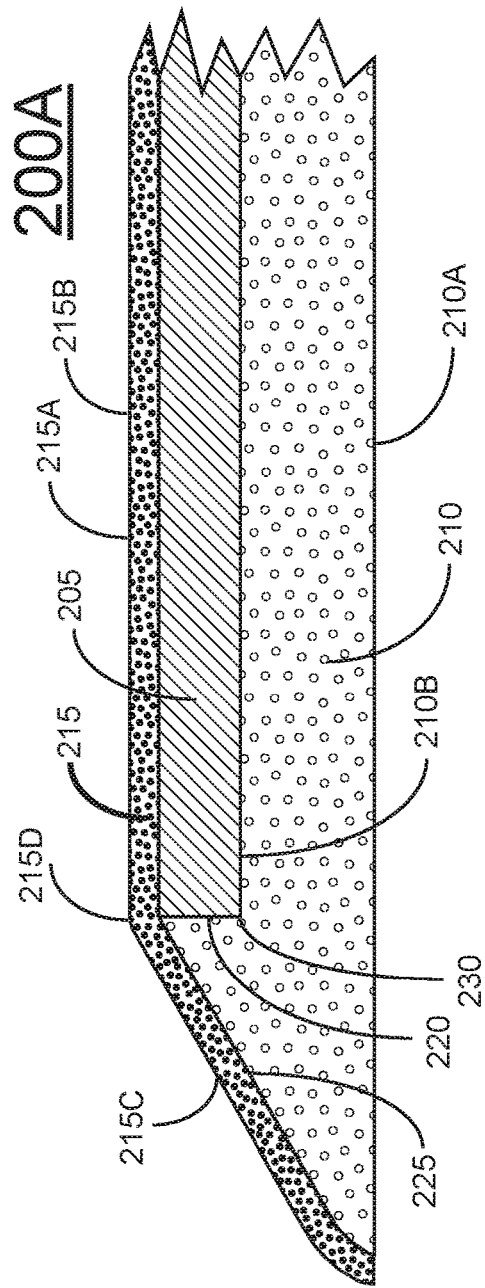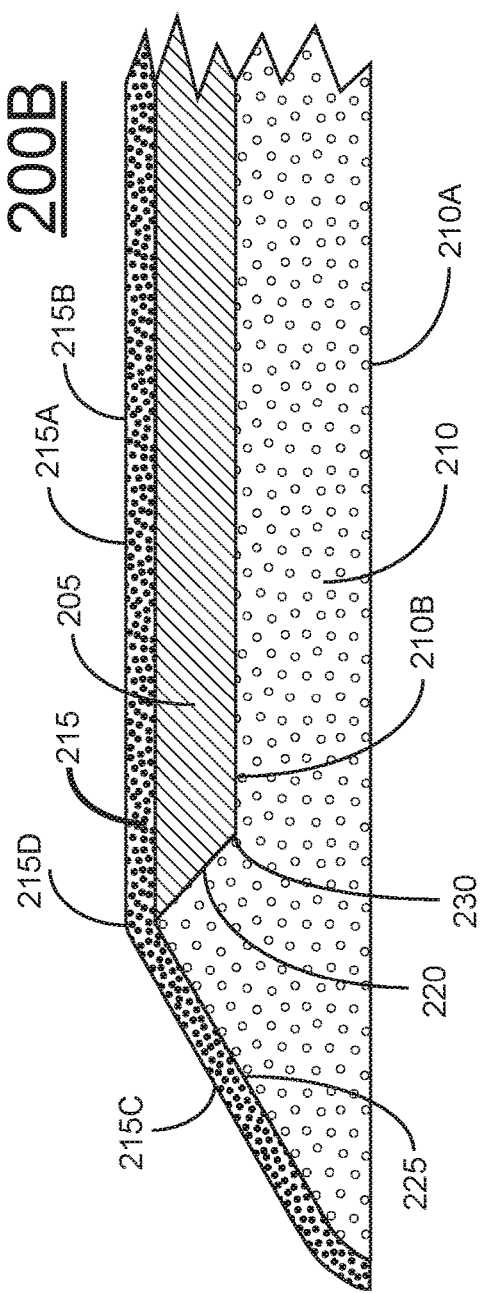

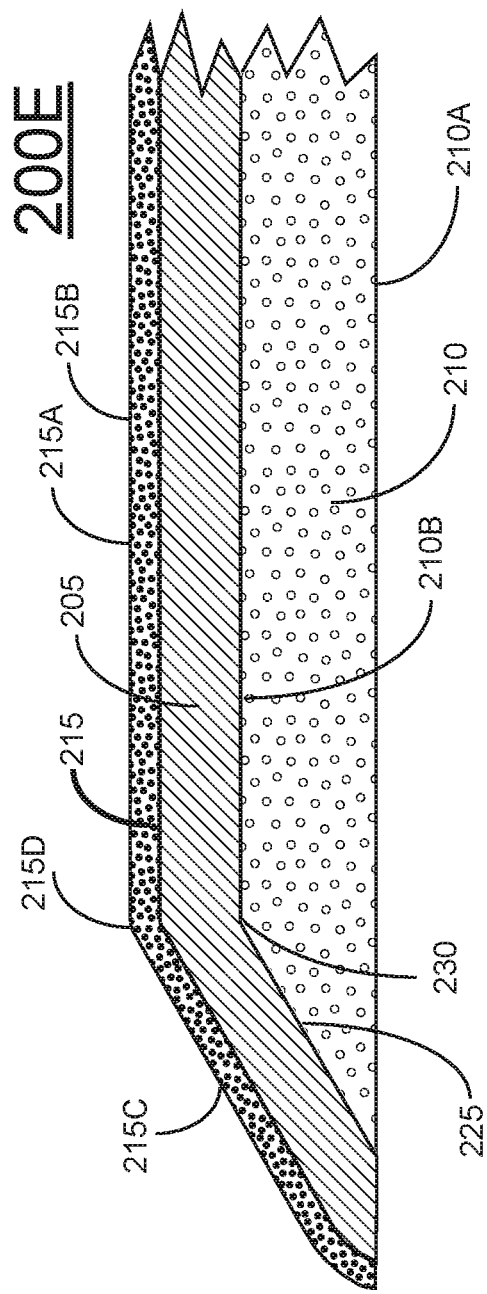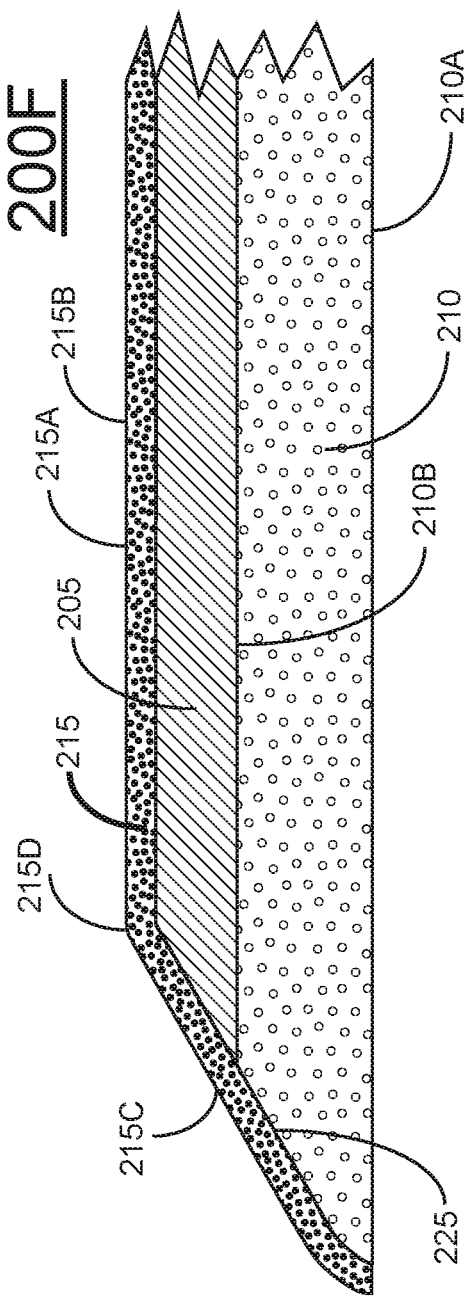

ANTI-FATIGUE MAT WITH AN ENCAPSULATIVELY SEALED GEL MEMBER

CROSS REFERENCE TO RELATED PATENT APPLICATIONS

This patent application is a divisional patent application of, and claims priority to, U.S. patent application Ser. No. 14/705,957, filed May 6, 2015, inventors McMahan et al., entitled "Method and Apparatus for Fabricating an Anti-Fatigue Mat Employing Multiple Durometer Layers With Molded Foam Under-Layer", which claims priority to Provisional U.S. Patent Application No. 61/989,514, filed May 6, 2014, inventors McMahan et al., entitled "Method and Apparatus for Fabricating an Anti-Fatigue Mat Employing Multiple Durometer Layers With Molded Foam Under-Layer". Both patent application Ser. No. 14/705,957 filed May 6, 2015 and patent application 61/989,514 filed May 6, 2014 are incorporated herein by reference in their entirety.

BACKGROUND

The disclosures herein relate generally to mats, and more specifically, to anti-fatigue mats that are more comfortable for parts of the body to contact.

Floor mats have been used for years to provide a cushion for the person standing on the mat. However, fatigue can still result when a person stands on a mat for an extended period of time. Persons who are standing up most of the day, such as cashiers, assembly line operators, people in home or commercial kitchens and many others still experience fatigue after standing on a conventional mat for long periods of time. Floor mats are often provided with non-slip surfaces to lessen slippage and to thus promote safety.

BRIEF SUMMARY

In one embodiment, an anti-fatigue mat includes a gel member. The mat also includes a foam member having a gel receiver that is shaped to receive the gel member therein, the gel member being situated in the gel receiver. The mat also includes a flexible cover layer situated atop the gel member and extending over the foam member such that the foam member and the flexible cover layer encapsulate the gel member therein.

In another embodiment, an anti-fatigue mat includes a gel member exhibiting a substantially rectangular geometry. The anti-fatigue mat also includes a foam member including a support surface that is shaped to support the gel member thereon, the gel member being situated on the support surface of the foam member, the foam member including a foam ramp extending outwardly downward from the gel member to a bottom surface of the foam member. The anti-fatigue mat further includes a flexible cover layer situated atop the gel member and extending over the foam ramp such that the foam member and the flexible cover layer together encapsulatively seal the gel member therein, the flexible cover layer including an indentation region at the foam ramp, the indentation region being situated substantially adjacent a gel/foam interface formed by the gel member and the foam member.

In another embodiment, a method of fabricating an anti-fatigue mat is provided. The method includes forming a gel member that exhibits a predetermined geometry. The method also includes forming a foam member that includes a gel receiver that is shaped to receive the gel member therein. The method further includes positioning the gel member in the gel receiver of the foam member. The method still further includes positioning a flexible cover layer atop the gel member and extending over the foam member such that the foam member and the flexible cover layer encapsulate the gel member therein.

In yet another embodiment, a method of fabricating an anti-fatigue mat is provided. The method includes forming a gel member that exhibits a predetermined geometry. The method also includes providing a mold with a core that is shaped to form a foam member around a portion of the gel member when the gel member is placed in the core of the mold. The method further includes placing the gel member in the core of the mold. The method still further includes supplying foam to the core of the mold to form the foam member around the portion of the gel member. The method also includes removing the gel member and foam member from the mold.

In still another embodiment, a method of fabricating an anti-fatigue mat is provided. The method includes forming a foam member that exhibits a predetermined geometry, the foam member including a gel receiver that is shaped to receive a gel member therein. The member also includes placing gel in the gel receiver to provide the gel member to the gel receiver. The method further includes attaching a flexible cover layer to the gel member and the foam member such that the flexible cover layer and the foam member encapsulate the gel member therein.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 1A is a perspective view of one embodiment of the disclosed anti-fatigue mat.

FIG. 1B is a cross section of the anti-fatigue mat of FIG. 1A taken along section line 1B-1B.

FIG. 1C is a top plan view of the anti-fatigue mat of FIG. 1A.

FIG. 1D is a perspective view of one corner the anti-fatigue mat of FIG. 1A.

FIG. 2A is an enlarged cross section of a portion of the anti-fatigue mat of FIG. 1A.

FIG. 2B is an enlarged cross section of a portion of another embodiment of the anti-fatigue mat.

FIG. 2E is an enlarged cross section of a portion of another embodiment of the anti-fatigue mat.

FIG. 2F is an enlarged cross section of a portion of another embodiment of the anti-fatigue mat.

DETAILED DESCRIPTION

Figure 2C:
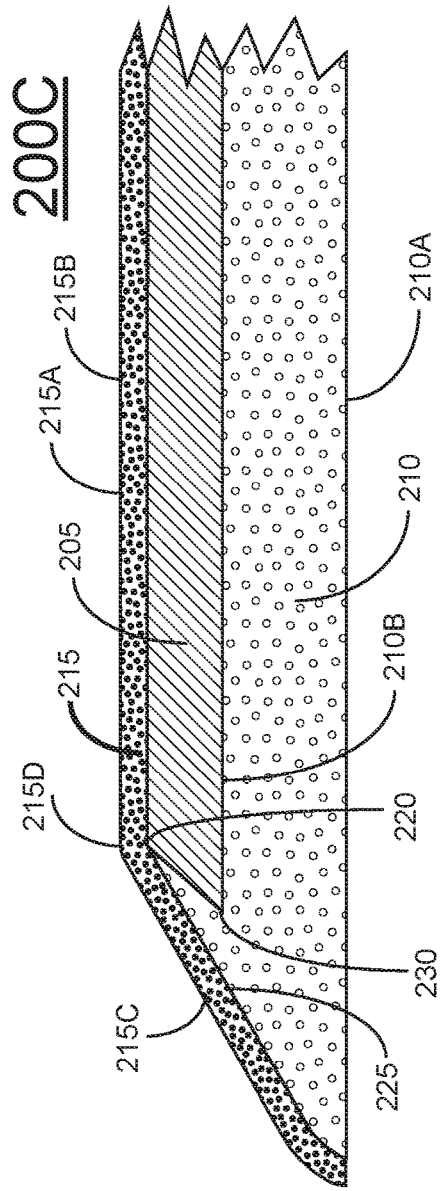
FIG. 2C is an enlarged cross section of a portion of another embodiment of the anti-fatigue mat.
Figure 2D:
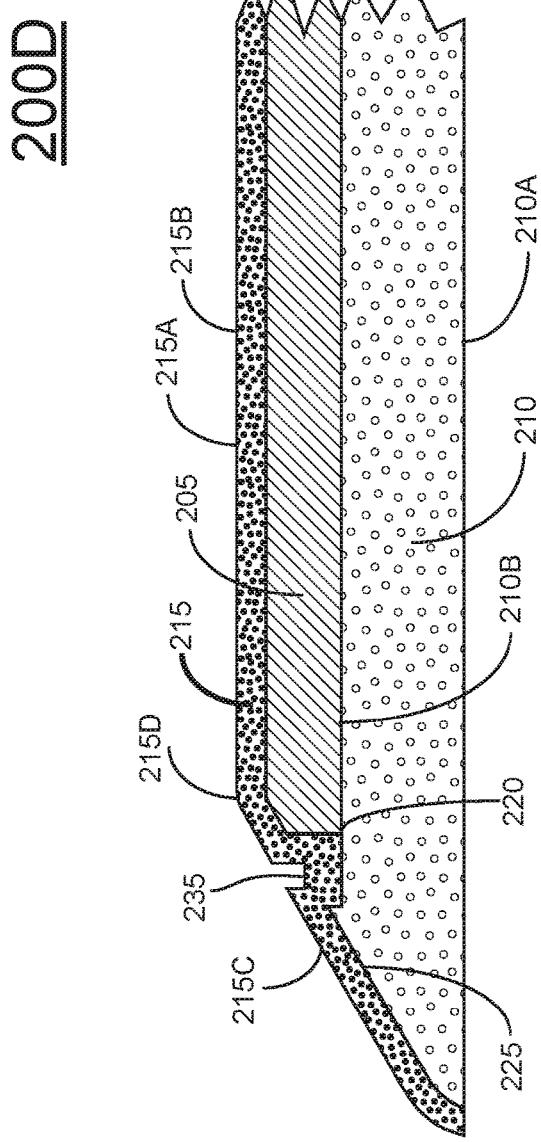
FIG. 2D is an enlarged cross section of a portion of another embodiment of the anti-fatigue mat.

The disclosed anti-fatigue mat and methodology for manufacturing the anti-fatigue mat include several advances over conventional anti-fatigue mats and manufacturing methodology. In general terms, one embodiment of the disclosed mat provides an anti-fatigue surface that transforms hard standing surfaces such as those typically found in kitchens, salons and other work areas into a cushioned, anti-fatigue standing experience that improves comfort and productivity. In one embodiment, the disclosed mat enhances both user comfort and mat durability.

Anti-fatigue mats may experience a number of problems. For example, some gel mats include welded flanges around the mat periphery. These flanges may be fragile and easily bent. Another difficulty is that foam mats may be perceived as being softer than gel mats due to the larger amount of initial deflection that a user experiences when stepping on a foam mat as compared to a gel mat. Gel mats tend to be heavy and expensive due to the high cost of gel. Another problem is that gel mats may be difficult to roll up for packaging and shipping. Moreover, gel mats may become creased if rolled up for extended periods of time whether for shipping or storage. Gel mats can also be difficult and costly to manufacture. Another challenge is that internal layers within a gel anti-fatigue mat may move relative to one another, thus causing flange lift around the peripheral edge of the mat. To address this internal layer movement, earlier mats employed expensive oil resistant internal tape between layers. Yet another problem is that mats may move laterally across the floor. In one embodiment discussed below, a high traction thermoplastic polyurethane (TPU) coating is applied to the bottom of the mat to arrest or reduce such unintended movement.

In one representative embodiment, the disclosed anti-fatigue mat is a dual-density, i.e. dual durometer, mat that includes at least two layers wherein one layer is of a different density, i.e. of a different durometer, than the other layer. For example, in one embodiment the mat may include a gel top layer and a molded foam layer structure that provides an underlayment for the gel top layer. The molded foam layer structure may also be referred to as a foam member or foam under-layer. In one embodiment, this mat structure may eliminate the fragile welded flanges found on other anti-fatigue mats. In one embodiment, the molded foam layer structure may include an in-mold sprayed-on non-slip thermoplastic polyurethane (TPU) to provide an enhanced grip to the floor surface while providing easier manufacture and lower production cost. A polyurethane (PU) top fabric may be employed above the gel top layer and the molded foam structure as an option to a polyvinyl chloride (PVC) top fabric. In this case, the PU top fabric acts as a wear surface on which the user may stand.

FIG. 1A is a perspective view of one embodiment of the disclosed anti-fatigue mat 100. FIG. 1B shows a cross section of anti-fatigue mat 100 taken along section line 1B-1B of FIG. 1A. Anti-fatigue mat 100 includes a gel layer 205 situated on a foam underlayer 210. Foam underlayer 210 may be a molded foam underlayer in one embodiment. Foam underlayer 210 provides support to gel layer 205 above. A top fabric layer 215 is situated on gel layer 205 as shown. Foam underlayer 210, gel layer 205 and top fabric layer 215 cooperate to provide support to a user standing or resting on mat 100.

In one embodiment, a polyurethane (PU) top fabric 215 serves multiple purposes, namely it 1) provides flexibility when a user stands on the top fabric 215, 2) provides resistance to undesired interaction with the gel top layer 205, and 3) provides compatibility with PU gel when PU gel is employed as the gel forming gel layer 205. In one embodiment, the disclosed anti-fatigue mat employs a curved-edge periphery as illustrated in FIG. 1C. FIG. 1D is a close-up perspective view of a representative corner of one embodiment of the disclosed mat.

The molded foam layer 210, i.e. the molded foam underlayment or under-layer below gel layer 205 enhances the softness of the mat and allows less gel to be used in fabricating mat 100. Advantageously, the user experience may be enhanced while cost and weight may be reduced. A PU top fabric layer 215 may enhance the durability and product life of the anti-fatigue mat. A spray-on in-mold TPU bottom treatment (not shown) for foam layer 210 may provide enhanced traction of the anti-fatigue mat respect to the floor on which it lays. In one embodiment, because the internal layer surfaces of the mat are adhered together as part of the molding process, expensive internal tape may be omitted between layers. In one embodiment, molded foam layer 210 supports and captures the gel layer 205 above while providing a lower cost anti-fatigue mat than when high-quality pre-cut foam is employed to support the gel layer above. In one embodiment, molded foam layer 210 receives gel layer 205 and provides support thereto.

A number of different approaches may be employed to fabricate the disclosed anti-fatigue mat. In a first embodiment, the gel member 205 is formed first and then placed in a mold that is used to form the foam member 210 around a portion of gel member 205. The mold is formed in the general shape of gel member 205 together with the foam member 210 such as depicted in FIGS. 2A-2D. This is described in Method 1 below and may be referred to as a "back-foaming" embodiment. In a second embodiment, the foam member 210 is formed first and the gel member 205 is formed subsequently in a gel receiver such as a gel receiving cavity in the foam member. In this approach, the gel member may be attached to the gel receiver in the foam member by pouring heated gel into the gel receiver of the foam member, thus mechanically attaching the gel member to the foam member (such as in Method 2 below), or by adhesively attaching the gel member to the foam member (such as in Methods 3 and 4 below).

In a first embodiment as shown in FIG. 2A, the disclosed mat 200A is a floor mat that includes a top wear surface 215A and a non-slip bottom surface 210A with gel member 205 captured within the mat's sealed interior. The non-slip bottom surface 210A may be on the bottom of foam member 210. Method 1, i.e. back-foaming methodology, may be employed to fabricate the disclosed mat 200A of the first embodiment. The disclosed mat may include the following elements that are listed in order from top to bottom to form a representative stack:

Method 1 (gel member 205 formed first, then foam member 210 formed in a mold around the gel member 205):
  Top Fabric 215 (provides the wear surface)
  Gel member 205
  Scrim (not shown)
  Molded Foam member 210
  Non-slip Coating 210A

In more detail, the first embodiment using Method 1 may employ the following representative stack from top to bottom of the mat:
  Top Fabric 215
    The top fabric may be vinyl with a woven or non-woven Polyurethane scrim.
    The top wear surface 215A may be either PVC or Polyurethane (PU) and may contain a flame retardant.

Gel member 205
　The gel may be an oil-based Styrene Block Copolymer or PU.
Scrim
　The scrim may be Polyester. The scrim may assist the gel member 205 in adhering to the molded foam member 210.
Molded Foam member 210
　The foam may be molded PU.
Non-slip Coating 210A (aka High-traction Coating) on the bottom on the molded foam member 210.
　The non-slip coating 210A may be TPU that is sprayed or otherwise applied to the mold before processing.

In a second embodiment, the disclosed mat may be fabricated by any one of Methods 2, 3 and 4 below. The mat may include the following elements that are listed in order from top to bottom to form a representative stack:

Method 2 (foam member 210 is formed first and the gel member 205 is formed subsequently in a gel receiving cavity 210B in the foam member):
Top Fabric 215
Adhesive
Scrim
Gel member 205 (heated gel poured into gel receiving cavity of the foam member 210)
Scrim (optional)
Adhesive (optional)
Molded Foam member 210
Adhesive
Non-slip surface 210A:
　Coating
　Fabric
　Self-skinning Foam In more detail, the stack formed in the second embodiment by using Method 2 may include:
Top Fabric 215
　The top fabric may be a film without a scrim.
　　Alternatively, the included scrim could be woven or non-woven in a material such as Polyester or other material such as:
　　　Cotton
　　　Nylon
　　　Other fibrous or amorphous materials
Adhesive
　An adhesive or adhesive promoter may be used between layers
Scrim
　A scrim may be used between layers to aid permanently connecting layers.
　The scrim may be laid atop the hot gel 205 or poured into it, thus attaching it mechanically as the gel freezes.
　Alternatively, the scrim could be attached to the gel 205 by making the gel more sticky through formulation or with an additive.
　The scrim may be woven or non-woven in a material such as Polyester or other material such as:
　　Cotton
　　Nylon
　　Other fibrous or amorphous materials
Gel member 205
　Any gel type may be used including:
　　Oil-based
　　Polyurethane-based
　　Silicone-base
　　Other gel
Scrim (optional)
　A scrim may be used between layers to aid permanently connecting layers.
　The scrim may be laid atop the hot gel 205 or poured into it, thus attaching it mechanically as the gel freezes.
　Alternately, the scrim may be attached to the gel 205 by making the gel more sticky or attractive.
　The scrim may be woven or non-woven in a material such as Polyester or other material such as:
　　Cotton
　　Nylon
　　Other fibrous or amorphous materials
Adhesive (optional)
　An adhesive or adhesive promoter may be used between layers.
Foam member 210
　Foam may be pre-cut foam, molded or foam-in-place.
　Foam can alternatively be any type of soft material including:
　　Polyester
　　Polyethylene
　　Rubber-based
　　Plant-based
　　Other
Adhesive (optional)
　An adhesive or adhesive promoter may be used between layers.
Non-slip bottom 210A
　Another term for "non-slip" properties is "high traction" properties which the bottom of the mat should exhibit. It is desirable that the bottom 210A of the disclosed anti-fatigue mat fabricated by Methods 1-4 includes such a non-slip bottom 210A. The non-slip bottom surface 210A may be in alternative forms including:
　Coating
　　A coating may be applied as a spray, roll-on or brush-on layer either in-mold or applied post-process.
　Film
　　A film sheet may be applied in-mold or adhered post-process to the mat bottom to provide a non-slip surface.
　Bottom Fabric
　　A high-traction or non-slip bottom fabric may be applied to the bottom of the mat either in-mold or post-process
　　In some embodiments, the bottom fabric may be peripherally attached, fully attached or partially attached to allow relative movement between layers.
　Self-skinning Foam
　　If a self-skinning foam is used, its bottom surface may exhibit sufficient grip to allow it to be used as the non-slip or high-traction surface without additional enhancements.

If a non-slip coating 210A other than sprayed-on TPU is used on the mat bottom, an additional adhesive layer may be needed between the molded foam member 210 and the non-slip layer or coating 210A.

Method 3 (foam member is formed first and the gel member is formed subsequently in a gel receiving cavity in the foam member). The stack formed may include:
Top Fabric 215
Adhesive Scrim Gel member 205 (heated gel poured into gel receiving cavity 210B of the foam member 210)

Scrim

Adhesive

Molded Foam member 210

Non-slip Coating 210A

Method 4 (foam member 210 is formed first including gel receiving cavity 210B and the gel member 205 is formed subsequently in the gel receiving cavity 210B in the foam member 210). The stack formed may include:

1. Top Fabric 215
2. Gel member 205 (heated gel poured into gel receiving cavity of the foam member)
3. Scrim
4. Adhesive
5. Molded Foam member 210
6. Non-slip Coating 210A As discussed above, FIG. 1B shows a simplified cross section of the disclosed anti-fatigue mat. FIG. 2A shows more detail with respect to the approximate locations of each element within the disclosed mat by showing a representative enlarged portion of mat 200A. In one embodiment, the disclosed anti-fatigue mat of FIG. 2A includes a foam member 210 having a gel receiver 210B, i.e. a gel receiving region. In this particular embodiment, the gel receiver 210B is a recessed region in the foam member 210. The gel receiver 210B may extend into the foam member 210 a sufficient distance to receive a gel member 215 therein. In one embodiment, the height of the gel receiver 210B is approximately equal to the height of the gel member 205 situated therein, as shown in FIG. 2A. The gel receiver 210B of the foam member 210 partially encapsulates the gel member 205 on the bottom of the gel member and the sides of the gel member 205. With the top fabric 215 situated on the gel member 205 and extending onto the foam member 210 as shown in FIG. 2A, the gel member 205 is completely encapsulated by the top fabric 215 on the top of the gel member 205 and the gel receiver 210B on the bottom and sides of the gel member 205.

A gel to foam transition 220 is formed between the side of the gel member 205 and the corresponding mating side of the gel receiver 210B as shown in FIG. 2A. The foam member 210 includes a ramp 225 that extends from the gel to foam transition 220 to the bottom of the foam member 210 as shown. In one embodiment, the ramp 225 may exhibit an angle with respect to the bottom of the foam member 210A of approximately 30° to reduce tripping. Other embodiments are possible wherein the ramp angle may be in the range of approximately 18 degrees to approximately 45 degrees. Ramp angle values greater or less than these values may also be employed depending on the particular application.

In more detail, the top fabric 215 may include two portions, namely a top fabric main portion 215B situated above and parallel with the top of the gel member 205, and a top fabric side portion 215C extending along the ramp 225 from the contour line 215D to the bottom of the mat. In one embodiment, the anti-fatigue mat is configured such that the contour line 215D is situated at the gel to foam transition 220. In this manner, a witness line that might otherwise undesirably appear in the top fabric 215 due to the gel to foam transition 220 may be hidden by the contour line 215D above the gel to foam transition. In the embodiment of FIG. 2A, the included angle 230 is approximately 90°. However, other embodiments are possible wherein the included angle 230 is an angle other than 90°, as discussed in more detail below.

For example, FIG. 2B shows an embodiment of the anti-fatigue mat 200B wherein the included angle is greater than 90°. When comparing the various views and embodiments of the mat, like numbers indicate like elements. FIG. 2C shows an embodiment of the anti-fatigue mat 200C wherein the included angle is less than 90°. The disclosed anti-fatigue mat is configured to provide a consistent feel everywhere a foot may touch the mat. Because the ramp 225 of the disclosed mat is formed of foam, while the flat top fabric main portion 215B of the mat is formed of gel, the configuration of the ramp 225 and gel 205 is [[are]] carefully balanced so that the foot cannot detect a significantly different feel for each surface, wherein both the ramp 225 and the flat top main portion 215B are covered by top fabric 215 and thus made to look like one continuous object. In one embodiment, this consistent feel is achieved by manipulating foam density, depth of the gel and geometry of the mat. As seen in FIG. 2C, one corner of the gel member is the gel/foam transition 220 and the other corner of the gel member is included angle 230. To hide the transition between the foam member 210 and the gel member 205 that might otherwise be undesirably visible as an irregularity (witness line) in the top fabric 215 of the mat, the gel/foam transition 220 is situated to be coincident with the contour line, and vice versa. Varying the included angle from values less than 90 degrees to values greater than 90 degrees may change the feel of the gel foam transition area to a desired consistency according to the particular application.

As described in the embodiments above, by keeping the "gel/foam transition" (i.e. gel/foam interface) coincident with the contour line shown, a witness line that would occur at the gel/foam interface will be hidden in the confusion of the transition from horizontal to sloped attitude. In an alternative embodiment depicted in FIG. 2D, the gel/foam interface witness line may be hidden within the confusion of a style region 235, i.e. indentation region, such as depicted in mat 200D. This particular indentation region 235 is U-shaped and extends around the perimeter of the mat, but other geometry indentation regions such as semi-circular, V-shaped and still other geometries may be employed as well.

The mat structures shown and described above effectively encapsulate the gel member 205 within the mat. More specifically, the gel receiver 210B of the foam member 210 encapsulates a portion of the gel member therein as shown in FIG. 2A. Encapsulation of the gel member 205 within the anti-fatigue mat is completed by the top fabric 215 above the gel member 205 and the foam member 210. In one embodiment, this encapsulation approach may eliminate or reduce witness lines. This encapsulation approach may also eliminate welded flanges on the peripheral edges of the mat.

FIG. 2E depicts an embodiment of the disclosed anti-fatigue mat 200E wherein the gel member 205 is encapsulated between the foam member 210 and the non-slip layer 210A on the bottom of the mat and the top fabric 215 on the top of the mat. FIG. 2F depicts an embodiment of the disclosed anti-fatigue mat 200F wherein the gel member 205 is encapsulated between the foam member 210 and the top fabric 215 on the top of the mat.

In the embodiment of the disclosed anti-fatigue mat depicted in FIGS. 1A-1C, the anti-fatigue mat exhibits a generally rectangular geometry as shown in the perspective view of FIG. 1A and the plan view of 1C. This generally rectangular geometry includes four (4) rounded corners. The mat includes two (2) opposed short sides and two (2) opposed long sides. The short sides exhibit a large radius to give the mat a distinctive shape and appearance. In one embodiment, wherein the width of the mat is the shorter dimension of the mat, the radius of the mat may be larger than twice the width of the mat. The large radius gives the two short sides of the mat their curved appearance. Other embodiments of the mat are possible wherein the radius is smaller or larger than the example above depending on the particular application.

Figure 3A:
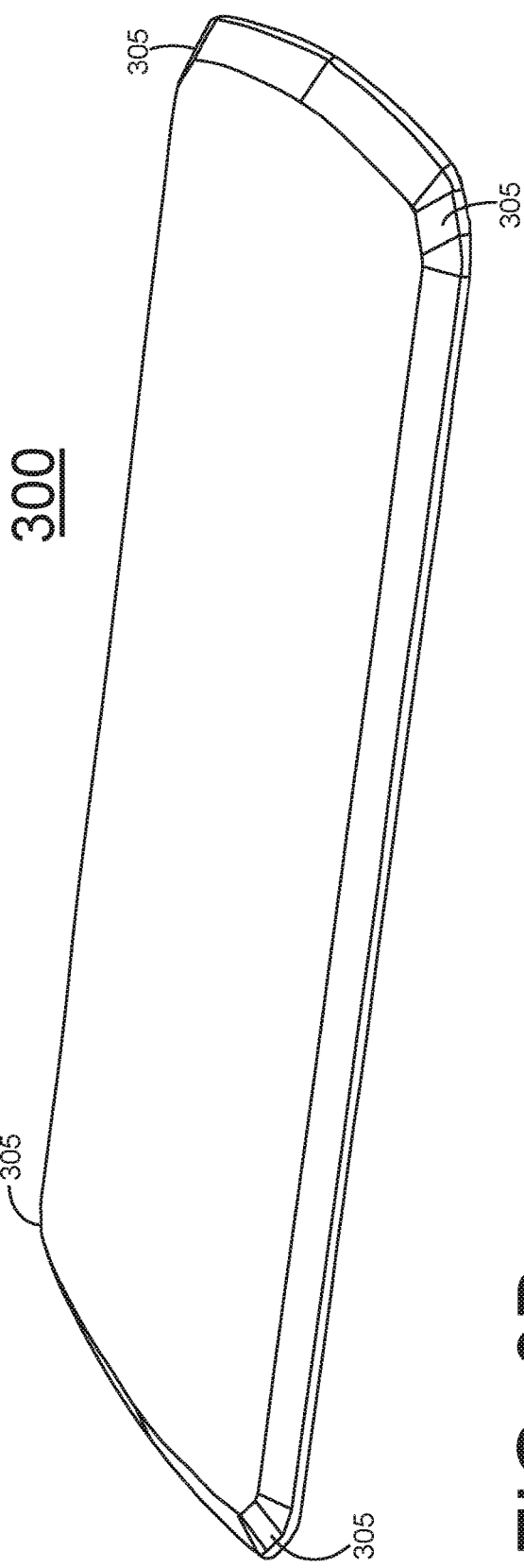
FIG. 3A is a perspective view of another embodiment of the disclosed anti-fatigue mat.
Figure 3B:
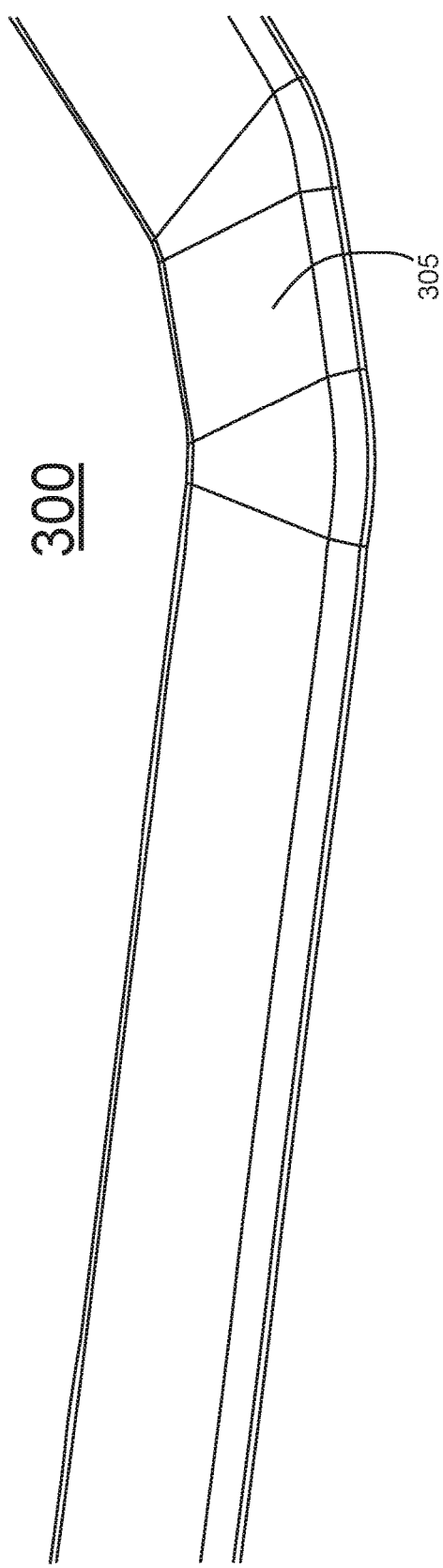
FIG. 3B is an enlarged perspective view of the anti-fatigue mat of FIG. 3A.
Figure 3C:
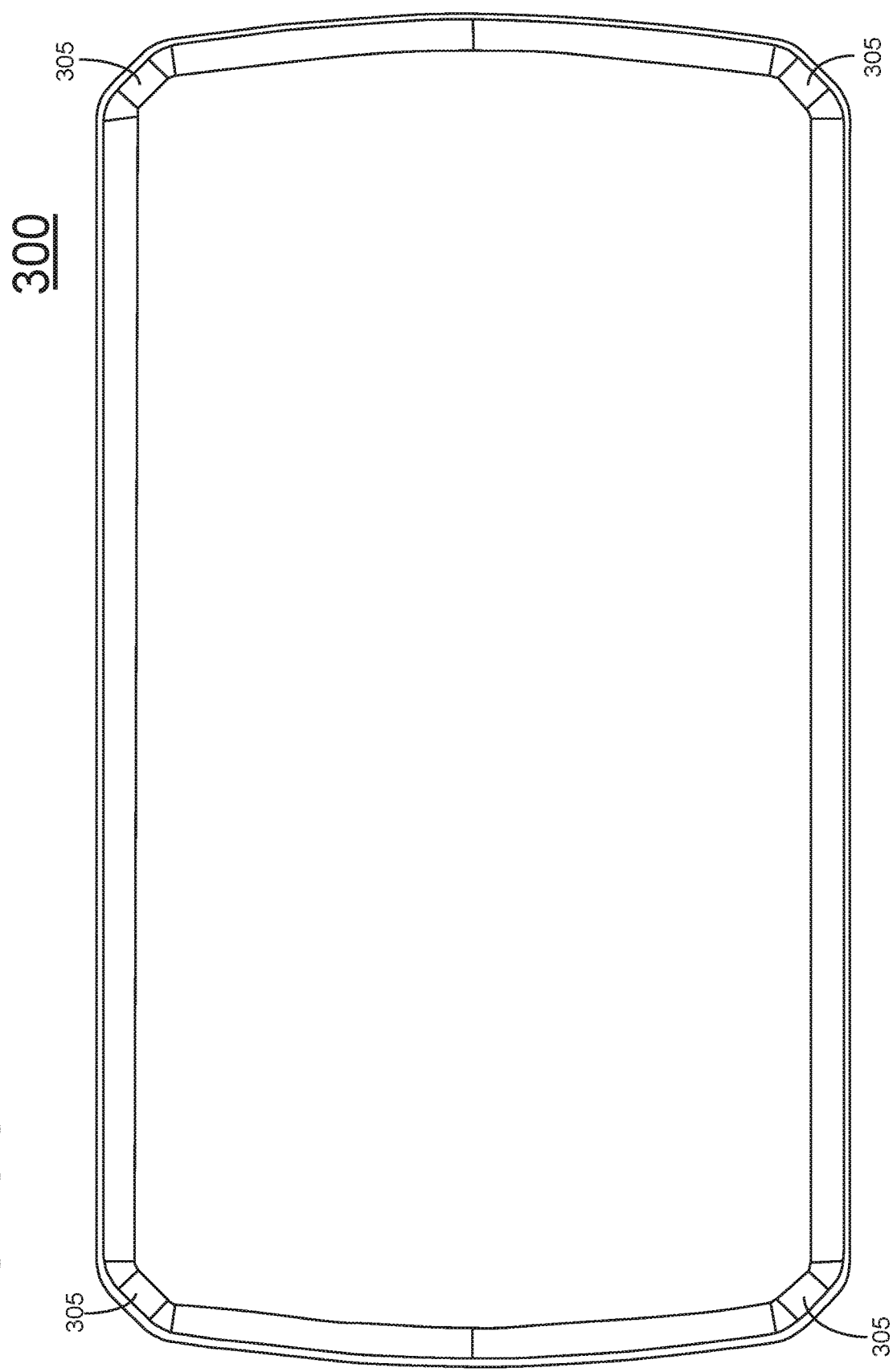
FIG. 3C is a top plan view of the anti-fatigue mat of FIG. 3A.

In an alternative embodiment, the anti-fatigue mat 300 of FIGS. 3A, 3B and 3C is similar to the anti-fatigue mat of FIGS. 1A, 1D and 1C with the short sides exhibiting a large radius. However, in the mat 300 embodiment the corners 305 exhibit a chamfered shape as illustrated. FIG. 3B provides a close up view of a representative chamfered corner 305.

In one embodiment, a method is disclosed for manufacturing the above-described anti-fatigue mat. The method may include the following sequence of manufacturing events:

1) Gel is poured onto the top fabric in the same manner as described in U.S. Pat. No. 7,754,127, McMahan, issued Jul. 13, 2010, entitled "Method for Fabricating An Anti-Fatigue Mat" and U.S. Pat. No. 7,862,680, McMahan, issued Mar. 23, 2010, entitled "Method and Apparatus For Fabricating An Anti-Fatigue Mat Employing Multiple Durometer Layers", the disclosures of which are incorporated herein by reference in their entirety. More specifically, the mat may be fabricated as described in these patents, except with the following modifications.

a) The first frame member may be cooled, left at room temperature or heated.

b) Registration apparatus are used to ensure alignment for subsequent fixturing. The registration apparatus aligns the gel-pouring fixture with a foam molding fixture that is later employed. This registration may be achieved by:
  i) Using mechanical alignment apparatus on both the gel pouring fixture and the foam molding fixture such as die-cutting the top fabric blank in advance with registration holes that align with pins in both the gel pouring fixture and foam molding fixture;
  ii) Using laser alignment apparatus on both the gel pouring fixture and foam molding fixture.
  iii) Using visual alignment features marked on both the gel pouring fixture and foam molding fixture.

2) A scrim is situated on the hot gel that is poured on the top fabric.

3) The gel is allowed to cool, thus forming a gel/top fabric assembly, i.e. gel pouring fixture. If a PU top fabric is used, air-cooling may be employed.

4) A mold-release is sprayed into a foam molding fixture which includes a mold interior core geometry that is shaped to form the foam member. For example, the interior of the mold may be shaped in the geometry of the foam member of FIG. 2A.

5) The gel/top fabric assembly (gel pouring fixture with top fabric) is placed in contact with and aligned with the foam molding fixture.

6) A holding apparatus holds the gel/top fabric assembly in place on the foam molding fixture and prevents the gel and top fabric from sagging prior to molding including. Suitable holding apparatus may include:
  a) a vacuum holding apparatus, or
  b) an adhesive holding apparatus, or
  c) a gravity holding apparatus 7) A spray-on TPU non-slip coating is applied to the core side foam molding fixture.

8) A self-blowing urethane foam mixture is sprayed into the foam molding fixture. The foam fills the interior of the foam molding fixture to assume the shape of the mold interior (i.e. core), such that the foam member takes on the geometry of the foam member depicted in FIG. 2A including a ramp, an included angle a gel receiver, all as illustrated.

9) The fixture is closed and clamped.

10) After a predetermined amount of time during which the foam cures, the mold is opened and the mat assembly is ejected. The gel member is now encapsulated within the mat by the foam member and the top fabric.

11) The mat assembly is placed into a cutting fixture and the excess top fabric material is trimmed to complete fabrication of the mat.

In an alternative embodiment, the following method may be employed to manufacture the anti-fatigue mat. The sequence of manufacturing events is as follows:

1) Gel is cast, poured, molded or cut into the desired shape, as shown in FIG. 2A, and may include scrim on one or both sides to aid adhesion to the top fabric and foam, respectively.

2) Foam is cast, molded or cut into the proper shape to form the foam member shown in FIG. 2A, 2B or 2C.

3) The gel member is adhered to the foam member, thus forming a gel/foam subassembly. An adhesive may be used for this purpose.

4) Top fabric is adhered to gel/foam subassembly in the position illustrated in FIG. 2A.

5) A non-slip portion is adhered, applied or attached to gel/foam subassembly. Alternatively, a self-skinning foam may be employed as the foam member such that the bottom of the foam member provides its own non-slip or high-traction surface.

6) The mat subassembly is placed into a cutting fixture and the excess top fabric is trimmed to complete fabrication.

The above-described manufacturing method achieves reduced manufacturing time and employs fewer elements than other manufacturing methods. The method also allows expensive gel to be positioned at locations in the mat where it is used most effectively. This enables a reduction of the amount of gel used to fabricate a mat. The molded foam structure of the mat is located where it is most effective in the mat and takes the place of more expensive gel. In one embodiment the foam fills out the shape crisply due to a blowing agent, and provides an initial deflection that is user-preferred, and allows edge contours that are ergonomic.

It is noted that the mat may be fabricated in an inverted fashion starting with the top fabric being placed in the frame assembly before pouring the hot gel thereon. The frame assembly is effectively a gel-pouring fixture.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. An anti-fatigue mat, comprising:
   a gel member exhibiting a substantially rectangular geometry;
   a foam member including a support surface that is shaped to support the gel member thereon, the gel member being situated on the support surface of the foam member, the foam member including a foam ramp extending outwardly downward from the gel member to a bottom surface of the foam member; and
   a flexible cover layer situated atop the gel member and extending over the foam ramp such that the foam member and the flexible cover layer together encapsulatively seal the gel member therein, the flexible cover layer including an indentation region at the foam ramp, the indentation region being situated substantially adjacent a gel/foam interface formed by the gel member and the foam member.

2. The anti-fatigue mat of claim 1, wherein the indentation region is situated at a predetermined distance from a peripheral edge of the mat.

3. The anti-fatigue mat of claim 2, wherein the indentation region extends around the mat at the predetermined distance.

4. The anti-fatigue mat of claim 1, wherein the gel member and the foam member exhibit different durometers.

5. The anti-fatigue mat of claim 1, wherein the gel member includes a gel ramp, the gel ramp and the foam ramp together forming a mat ramp on which an outer portion of the flexible cover layer is situated.

6. The anti-fatigue mat of claim 1, wherein the flexible cover layer includes a flexible cover layer main portion situated above and parallel with a top of the gel member.

7. The anti-fatigue mat of claim 6, wherein the flexible cover layer includes a flexible cover layer side portion situated above and parallel with the mat ramp.

8. The anti-fatigue mat of claim 1, wherein the indentation region is U-shaped.

9. The anti-fatigue mat of claim 1, wherein the indentation region is semicircularly-shaped.

10. The anti-fatigue mat of claim 1, wherein the indentation region is V-shaped.

11. The anti-fatigue mat of claim 5, wherein the indentation region is situated at a predetermined distance from a top of the mat ramp.

12. The anti-fatigue mat of claim 5, wherein the indentation region is situated at a predetermined distance from a top of the gel ramp.

13. The anti-fatigue mat of claim 1, wherein the gel member is adhered to foam member.

14. The anti-fatigue mat of claim 1, further comprising an adhesive layer that adheres the gel member to the foam member.

15. The anti-fatigue mat of claim 1, further comprising a scrim layer that enhances adherence of the gel member to the foam member.

16. The anti-fatigue mat of claim 1, wherein the foam member comprises a self-skinning foam that forms a non-slip surface at the bottom surface of the foam member.

17. The anti-fatigue mat of claim 1, wherein the gel member is fabricated of sticky gel.

18. The anti-fatigue mat of claim 1, wherein the anti-fatigue mat includes rounded corners.

* * * * *